Sept. 20, 1938. C. E. ADAMS 2,130,575
DRILL POINT LOCATOR
Original Filed March 3, 1936 2 Sheets-Sheet 1
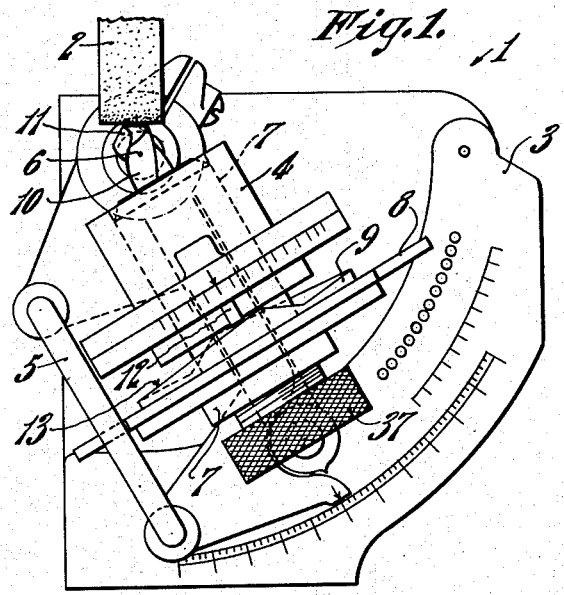
INVENTOR,
Carroll E. Adams,
BY
ATTORNEY.

Sept. 20, 1938.   C. E. ADAMS   2,130,575
DRILL POINT LOCATOR
Original Filed March 3, 1936   2 Sheets-Sheet 2
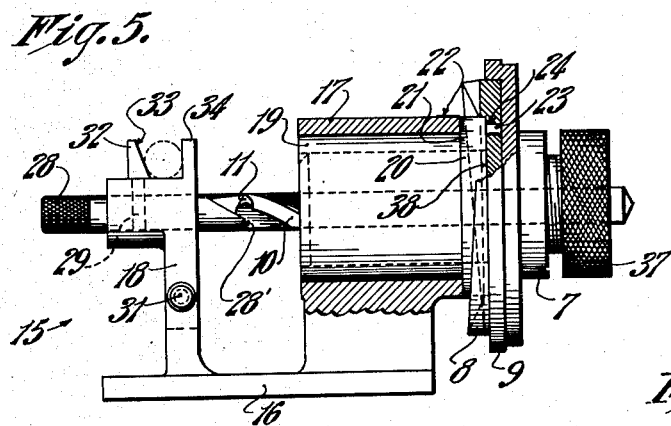
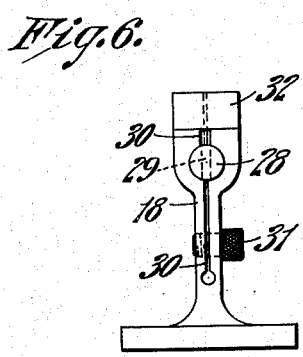
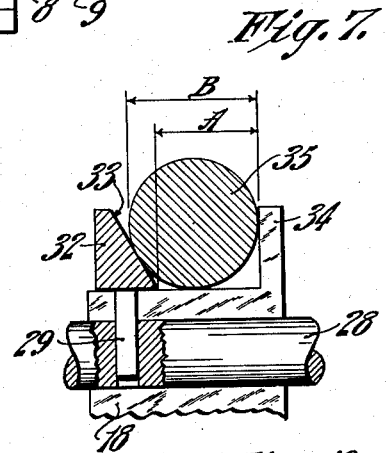
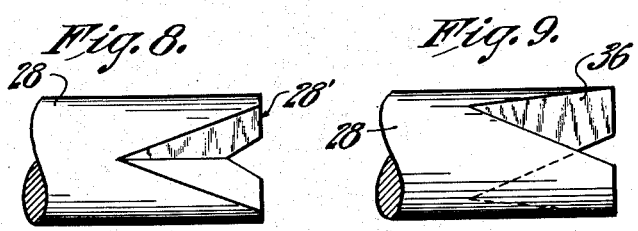
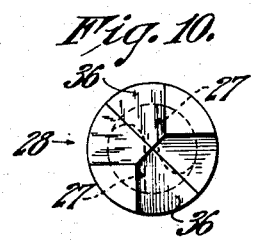
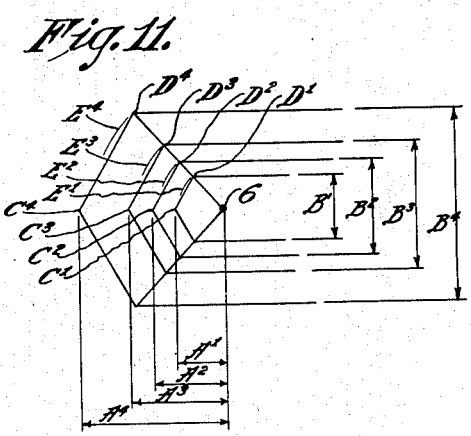
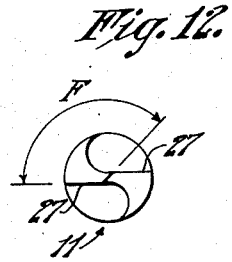
INVENTOR,
Carroll E. Adams
BY Blake & Seaver
ATTORNEY.

Patented Sept. 20, 1938

2,130,575

UNITED STATES PATENT OFFICE 2,130,575

DRILL POINT LOCATOR

Carroll E. Adams, Pawtucket, R. I.

Original application March 3, 1936, Serial No. 66,836. Divided and this application September 2, 1937, Serial No. 162,165

5 Claims. (Cl. 51—219)

This is a divisional application, the subject matter of which has been disclosed and described, but not claimed, in my pending application for a Drill grinder, filed March 3, 1936, and bearing Serial Number 66,836.

This invention relates to improvements in drill point locators, and is particularly adapted for use in positioning or locating a drill point in a suitable holder preliminary to grinding or sharpening the point of the drill.

An object of this invention is to provide, in cooperation with a drill grinding device including a holder or chuck for the drill, means for accurately and mathematically positioning or locating a drill in the chuck, both longitudinally as to the relative position of the drill point and chuck, and circumferentially as to the relative position of the cutting edges of the drill point and a point or points on the circumference of the chuck.

A further object of this invention is to provide, in cooperation with a drill grinding device including a holder or chuck for the drill having a "throw" cam and a "thrust" cam, means for accurately positioning drills of different diameters in the chuck so that the relative longitudinal distances between the drill points and the "thrust" cam will be based on a definite mathematical formula, and the relative position of the cutting edges of the drill point and the lobes of the "throw" cam will be the same for drills of the same or different diameters, whereby drills of the same or different diameters will be ground with identical relief angles and included point angles.

A still further object of this invention is to provide, in a device of the character described, means for utilizing the diameter of the drill to be ground as the determining factor in the longitudinal positioning of the drill point.

These, and other objects and advantages of this invention, will be more completely described and disclosed in the following specification, the accompanying drawings, and the appended claims.

Broadly, this invention comprises a supporting sleeve for a drill chuck, adjustable means for positioning the drill chuck circumferentially relative to the supporting sleeve, a template or plug slidably supported on the axis of the supporting sleeve and formed for engaging the cutting edges of a drill point, and means for utilizing the diameter of a drill to be ground for longitudinally positioning the template or plug, whereby a drill held in the chuck with the drill point engaged on the plug will have the drill point definitely and accurately positioned, both circumferentially and longitudinally relative to the chuck, the longitudinal position of the drill point being determined by a definite proportion of the drill's diameter.

A preferred embodiment of this invention is illustrated in the accompanying drawings, in which:—

Figs. 1 to 4, inclusive, are illustrative of the apparatus with which the drill point locator is associated, and are used to demonstrate the results obtained by the locator.

Figs. 5 to 10, inclusive, illustrate the construction of the drill point locator, and Figs. 11 and 12 are diagrams illustrating the operation of the drill point locator.

Fig. 1 is a plan view of a drill grinding apparatus.

Fig. 2 is a side elevational view of the chuck-supporting sleeve shown in Fig. 1.

Fig. 3 is a side elevational view of the drill chuck shown in Fig. 1.

Fig. 4 is an end elevational view of the drill chuck shown in Fig. 3, illustrating the throw and thrust cams on the chuck.

Fig. 5 is a side elevational view of the drill point locator with the drill chuck in position and a part of the cams in section.

Fig. 6 is an end view of the locating template or plug and its support.

Fig. 7 is an enlarged sectional view illustrating the method of setting or positioning the drill point locating plug.

Fig. 8 is a partial, side elevational view of the locating plug, illustrating the method of forming the end.

Fig. 9 is a side elevational view of the locating plug as it is assembled in the supporting clamp.

Fig. 10 is an end view of the locating plug, as it is positioned in its supporting clamp.

Fig. 11 is a diagrammatic view illustrating the relation between drill points of different diameters and a pivot point on the grinding apparatus on which the drill chuck oscillates while grinding a drill point, and also the relation between the drill diameters and the position of the pivot point, and Fig. 12 is an end view of a drill point illustrating the term "chisel-edge angle" used in the specification.

Referring now to the drawings in detail, in which like numerals refer to like parts throughout:—

A drill grinding apparatus 1 includes a grinding wheel 2 and a base plate 3 on which a housing member 4 and an arm or buttress member 5 are pivotally supported at 6. A drill chuck 7 is slidably and rotatably supported in the housing 4, and has secured thereon a throw cam 8 and a thrust cam 9. A drill 10, having a cutting end or point 11, may be secured in the chuck 7 for the purpose of grinding the end or point 11 against the wheel 2, as shown in Fig. 1. A stud or pin 12, on the housing 4, is normally engaged on the annular cam face 13 of the thrust cam 9, and, as the chuck 7 is revolved, this engagement will generate a reciprocal longitudinal movement of the chuck 7 and drill point 11. At the same time, engagement of the cam edge 14 of the throw cam 8 on the buttress 5, as the chuck 7 is revolved, will generate an oscillating movement of the housing 4 about the pivot 6, which movement will be transferred directly to the chuck 7 and drill point 11. In operation, as the chuck 7 is revolved in the housing 4 with the necessary thrust or pressure exerted against the rear of the chuck, cooperation of these movements will present the drill point 11 to the grinding wheel 2 in the manner required to grind the drill point to the required characteristics, including a predetermined relief angle and included point angle.

From the above description of operation of the drill grinding apparatus and drill chuck, it will be understood by those skilled in the art that an accurate positioning of the drill point 11 and its cutting edges relative to the cams 8 and 9 is essential to the efficient operation of the grinding apparatus. It is an object of this invention to provide means for accurately positioning the drill point and its cutting edges relative to the cams 8 and 9, so that drills of the same or different diameters may be secured in the drill chuck 7 in such a manner as to produce, after grinding, drill points having identical characteristics, including identical relief angles and included point angles.

In order to grind drill points with identical relief angles and synonymous relief surfaces, it is necessary to provide means for setting or locating the drill point, in relation to the pivot point 6 of the throw cam 8, so that the distance from the point of the drill to the pivot point 6, represented by A1, A2, A3, and A4 in Fig. 11, is a definite and unchanging proportion of the corresponding drill diameters B1, B2, B3, and B4, of the drill to be ground, with each of the drill points C1, C2, C3, and C4 in a proper relative relation to the pivot point 6 of the swing or oscillation of the drill so that points D1, D2, D3, and D4, representing the intersection of the drill land and cutting edge, will swing about the pivot point 6 in concentric arcs. The distances between the drill points C1, C2, C3, and C4 and the pivot point 6, to produce this result, must vary directly in proportion to the diameter of the drill. As the distance between the pivot point 6 and the end of the stud 12, (see Fig. 1) is fixed, means are provided in the drill point locator for locating the drill point in the drill chuck relative to the cams 8 and 9 so that, with the cam 9 cooperating with the stud 12, the drill point will be properly located relative to the pivot point 6.

The invention herein claimed is illustrated in Figs. 5 to 10, inclusive. A drill locator 15, having a base portion 16, is formed with a bearing sleeve 17 in which the drill chuck 7 may be slidably supported. The locator 15 is also formed with an upwardly projecting arm 18 which is spaced from the sleeve 17, as indicated in Fig. 5.

A sleeve member 19, formed with a collar portion 20, is fitted into the bearing sleeve 17, and the periphery of the collar portion 20 is provided with gage or graduation marks 21 which cooperate with an index 22 on the sleeve 17 to circumferentially locate a stud or pin 23 on the collar 20. When the chuck 7 is inserted in the sleeve 19, the stud 23 is engaged in one of a pair of oppositely disposed openings 24 which are definitely located in the cam 9, (see Fig. 4), relative to the annular cam face 13 of the cam 9 and the cam edge 14 of the cam 8. Thus, the cams 8 and 9 are circumferentially positioned in the sleeve 19 by engagement of the stud 23 in one of the openings 24. This circumferential position of the cams 8 and 9 is adjustable, through cooperation of the collar 20 and index 22, for the following reasons.

The normal or usual chisel-edge angle F, (see Fig. 12) of a drill point is approximately 130 degrees. The angle between the point of return 25 and the point of advance 26 on the cam 8 is the same as the normal chisel-edge angle F. Therefore, the location of the point 26 at which the throw cam starts to swing the point of the drill away from the grinding wheel relative to the cutting edge of the drill determines the chisel-edge angle of the drill point. With a normal setting of the collar 20, the cams will be positioned to provide the normal chisel edge angle F. However, it has been found, by experiment and test, that varying the chisel-edge angle does not materially affect the power required for the torque, but will vary considerably the thrust power available for the heavier feeds. Therefore, the chisel-edge angle should be increased for the heavier feeds to reduce the power requirements. As the angle between the points 25 and 26 on the cam 8 is fixed, it is necessary, in order to increase the chisel-edge angle, to retard the point 26 relative to the cutting edge 27 of the drill point 11. This is accomplished by the circumferential adjustment of the collar 20 and stud 23.

A locating plug 28, for longitudinally positioning the drill point 11 relative to the cams 8 and 9 and for positioning the cutting edges 27 of the drill point relative to the stud 23 and cams 8 and 9, is slidably and adjustably supported in the arm 18, and locked against rotation by a pin 29 engaged in a slot 30 formed in the arm 18. The plug 28 is clamped in adjusted position by a setscrew 31 in the arm 18. The pin 29 is formed as a part of a jaw 32 having a tapered face 33 opposed to a fixed jaw 34 on the arm 18. The angle of the face 33 of the jaw 32 is such that, when a drill 35 is laid between the jaws 32 and 34, as indicated in Fig. 7, the distance A, which is the distance the plug 28 is moved relative to the fixed jaw 34, will be the same proportion to the diameter B of the drill 35, as that indicated in the diagram in Fig. 11. Thus, the longitudinal position of the locating plug 28 relative to the cams 8 and 9 is directly controlled and governed by the diameter of the drill to be ground. The cutting edges 27 of a drill are located, circumferentially, in proper relation to the cams 8 and 9, by engagement against plane, vertical surfaces 36, cut in the end of the locating plug 28. These surfaces are formed in the plug 28 by cutting tapered, V-shaped, oppositely disposed recesses 37 in the end of the plug 28, as indicated in Fig. 8. As the web thickness of a drill point may be varied to suit conditions of work, and as the web thickness also varies with the diameter of the drill, the surfaces 36 are tapered, as indicated in Fig. 10, so that, no matter what the web thickness of the drill point engaged by the plug 28 may be, the cutting edges will always be positioned in vertical planes.

To set a drill properly in the chuck 7, the drill is first placed between the jaws 32 and 34 to locate the end 28' of the locating plug 28, after which the setscrew 31 may be tightened, and any number of drills having the same diameter will be identically located in the chuck 7. After locating the end of the plug 28, the drill is inserted in the chuck 7, with sufficient pressure exerted by the screw 37 to hold the drill lightly. The chuck 7 is then inserted in the sleeve 19 of the locator 15 with a recessed surface 38 in the cam 9 abutting the graduated collar 20 and the pin or stud 23 engaged in one of the openings 24 in the thrust cam 8. With the chuck 7 thus assembled in the locator 15, the drill is moved longitudinally and circumferentially, until the drill point 11 impinges against the plug 28 with the cutting edges 27 engaged on the vertical plane surfaces 36, as indicated in Fig. 5. The screw 37 is then set to firmly hold the drill in the chuck 7. The chuck 7 and drill are then removed from the locator 15 and inserted in the housing 4.

What I claim is:—

1. In a drill grinding apparatus, a cylindrical holder for a drill, a cam on said holder, means for locating a drill in said holder relative to said cam comprising, a sleeve in which said holder is removably supported, said sleeve being provided with a flange and a stud projecting axially from said flange, said cam being provided with a recess for engagement on said flange and an opening for receiving said stud, a bearing in which said sleeve is rotatably supported, an arm on said bearing, a drill point locator slidably and adjustably supported in said arm and spaced from said sleeve, said locator being formed with a plane surface for engaging a cutting edge of the drill, cooperating gage and index means on said flange and said bearing for circumferentially and adjustably positioning said sleeve and said cam relative to the plane surface of said locator.

2. In a drill grinding apparatus, a cylindrical holder for a drill, a cam on said holder, means for locating a drill in said holder relative to said cam comprising, a sleeve in which said holder is removably supported, said sleeve being provided with a flange and a stud projecting axially from said flange, said cam being provided with a recess for engagement on said flange and an opening for receiving said stud, a bearing in which said sleeve is rotatably supported, an arm on said bearing, a drill point locator slidably and adjustably supported in said arm and spaced from said sleeve, means for utilizing the diameter of the drill to be ground for positioning said drill point locator, said locator being formed with a plane surface for engaging a cutting edge of the drill, cooperating gage and index means on said flange and said bearing for circumferentially and adjustably positioning said sleeve and said cam relative to the plane surface of said locator.

3. In a drill grinding device, a drill holder, two cams secured to the drill holder and to each other for movement therewith, one cam having radial cam flange portions equal to the number of lips of the drill to be ground, the other cam having an annular cam surface with inclined surface portions thereon also equal in number to the number of lips of the drill to be ground, locating means for positioning a drill in the holder longitudinally and circumferentially relative to said cams comprising a bearing member, a sleeve provided with a graduated collar rotatably and adjustably supported in said bearing member and in which sleeve said drill holder is removably supported, an index on the bearing member cooperating with the graduations on said collar, a member adjustably spaced from a drill in the holder and slidably supported on the axis of the drill, means for positioning said spaced member governed by the diameter of the drill to be ground, means on said spaced member for engaging the lips of a drill in the holder, a pin on said collar cooperating with an opening in one of said cams for circumferentially positioning said cams relative to the drill lip-engaging means on said spaced member.

4. In a drill grinder, in combination, a drill holder, cam members on said drill holder, a drill locator in which said drill holder is temporarily located for adjustment of cutting lips and longitudinal adjustment of the point of the drill relative to said cams including a bearing member, a graduated collar member rotatably supported in said bearing member, an index pointer on said bearing member cooperating with said graduated collar member, cooperating elements on said collar member and one of said cam members for circumferentially securing said cam members and holder to said collar member, a movable locating plug spaced from said bearing member and having a plane surface against which a cutting edge of a drill point is placed for positioning relative to said cams, means for longitudinally adjusting the movable locating plug depending upon the diameter of the drill comprising an inclined face member connected to said movable plug member, a fixed member between which and said inclined faced member the drills to be ground are placed, whereby the movable plug member is definitely positioned relative to a predetermined proportion of the drill diameter, the drill holder having means for adjustably retaining a drill for locating the drill point on the face of said locating plug and for rigidly clamping said drill in adjusted position, as described.

5. In a drill point locator, an arm formed with a flat table, a plug slidably supported in said arm below said table, said arm being slotted between said plug and said table, a fixed jaw on said arm and projecting above said table, a second jaw slidably supported on said table and having a face opposed to and angularly disposed relative to said fixed jaw, a stud on said second jaw connecting said second jaw and said plug and engaged in said slot, whereby when a drill is placed transversely between the jaws and in contact with both, the position of the plug will be determined and controlled by a fixed proportion of the drill diameter.

CARROLL E. ADAMS.